(12) United States Patent
Cho et al.

(10) Patent No.: US 7,687,203 B2
(45) Date of Patent: Mar. 30, 2010

(54) POSITIVE ACTIVE MATERIAL FOR RECHARGEABLE LITHIUM BATTERY, METHOD OF PREPARING THE SAME, AND RECHARGEABLE LITHIUM BATTERY INCLUDING THE SAME

(75) Inventors: Jaephil Cho, Yongin-si (KR); Youn-Han Chang, Hwaseong-si (KR); Jin-Young Kim, Gumi-si (KR); Yoo-Jung Kim, Daegu (KR); Hyun-Jung Kim, Gyeongju-si (KR); Hae-Suk Hwang, Gumi-si (KR)

(73) Assignee: L & F Co., Ltd., Hosan-dong, Dalseo-gu, Daegu (KR)

(*) Notice: Subject to any disclaimer, the term of this patent is extended or adjusted under 35 U.S.C. 154(b) by 217 days.

(21) Appl. No.: 11/835,887

(22) Filed: Aug. 8, 2007

(65) Prior Publication Data

US 2008/0153001 A1 Jun. 26, 2008

(30) Foreign Application Priority Data

Dec. 21, 2006 (KR) .................. 10-2006-0131850

(51) Int. Cl.
*H01M 4/58* (2010.01)
(52) U.S. Cl. .............. 429/231.1; 429/231.3; 429/231.6; 429/231.9; 429/231.95; 429/221; 429/223; 429/224; 429/218.1; 427/58; 427/123; 427/126.4; 427/126.3

(58) Field of Classification Search .............. 429/231.3, 429/231.1, 231.6, 231.9, 231.95, 221, 223, 429/224, 218.1; 427/58, 123, 126.4, 126.3
See application file for complete search history.

(56) References Cited

U.S. PATENT DOCUMENTS 5,705,291 A 1/1998 Amatucci

FOREIGN PATENT DOCUMENTS

| JP | 9-055210 | 2/1997 |
|---|---|---|
| JP | 10-097857 | 4/1998 |
| JP | 2001-052705 | 2/2001 |
| JP | 2001-266879 | 9/2001 |
| KR | 10-2003-0088246 | 11/2003 |
| KR | 10-2006-0011393 | 2/2006 |

*Primary Examiner*—Laura S Weiner

(57) ABSTRACT

The positive active material according to one embodiment of the present invention includes a composite metal oxide of the following Formula 1, and a compound being capable of intercalating and deintercalating lithium having the composite metal oxide coated on the surface thereof.

$$M_{1-x}AlO_2 \quad \text{[Chemical Formula 1]}$$

Wherein, in the above Formula 1, M is selected from the group consisting of an alkali metal, an alkaline-earth metal, and combinations thereof, and $0.03 \leq x \leq 0.95$. The composite metal oxide increases impregnation of an electrolyte, improves lithium mobility, and decreases internal resistance of a rechargeable lithium battery, and thereby improves discharge capacity and cycle-life characteristics.

8 Claims, 3 Drawing Sheets

POSITIVE ACTIVE MATERIAL FOR RECHARGEABLE LITHIUM BATTERY, METHOD OF PREPARING THE SAME, AND RECHARGEABLE LITHIUM BATTERY INCLUDING THE SAME

CROSS-REFERENCE TO RELATED APPLICATION

This application claims priority to and the benefit of Korean Patent Application No. 10-2006-0131850 filed in the Korean Intellectual Property Office on Dec. 21, 2006, the entire contents of which are incorporated herein by reference.

BACKGROUND OF THE INVENTION (a) Field of the Invention

The present invention relates to a positive active material for a rechargeable lithium battery, a method of preparing the same, and a rechargeable lithium battery including the same. More particularly, the present invention relates to a positive active material for a rechargeable lithium battery that can improve discharge capacity and cycle-life characteristics, a method of preparing the same, and a rechargeable lithium battery including the same.

(b) Description of the Related Art

In recent times, due to reductions in size and weight of portable electronic equipment, there has been a need to develop batteries for use in the portable electronic equipment where the batteries have both high performance and large capacity.

Batteries generate electric power by using materials capable of electrochemical reactions at positive and negative electrodes. For example, a rechargeable lithium battery generates electricity due to a change of chemical potential when lithium ions are intercalated/deintercalated at positive and negative electrodes.

The rechargeable lithium battery includes a material that can reversibly intercalate/deintercalate lithium ions as positive and negative active materials. It is fabricated by charging an organic electrolyte solution or a polymer electrolyte between the positive and negative electrodes.

In general, a positive active material of a rechargeable lithium battery includes a lithium composite metal compound. For example, $LiCoO_2$, $LiMn_2O_4$, $LiNiO_2$, $LiNi_{1-x}Co_xO_2$ (0<x<1), $LiMnO_2$, and the like have been researched.

Manganese-based positive active materials such as $LiMn_2O_4$ or $LiMnO_2$ are the easiest to synthesize, relatively thermally stable, less costly than the other materials, and environmentally friendly. However, these manganese-based materials have relatively low capacity.

$LiCoO_2$ has good electric conductivity, high battery voltage, and excellent electrode characteristics. This compound is presently the most commercially available material and is made by Sony Corporation. However, it is relatively expensive and has low stability during charge-discharge at a high rate. $LiNiO_2$ is currently the least costly of the positive active materials mentioned above and has a high discharge capacity, but it is difficult to synthesize and the least stable among the compounds.

In order to improve electrochemical characteristics of positive active materials for a rechargeable lithium battery, a composition control, a particle size, and a surface treatment for positive active materials have been continuously researched.

Japanese Patent laid-open No. 1997-55210 discloses a positive active material for a rechargeable lithium battery that is prepared by coating Li—Ni-based oxide with an alkoxide including Mn, Al, or Co and then heat treating.

U.S. Pat. No. 5,705,291 discloses a positive active material for a rechargeable lithium battery including a compound being capable of intercalating and deintercalating lithiums coated with an oxide of Al, B, or Si so as to minimize metal ion elution at high temperature.

However, the above suggested method cannot provide uniform coating when a core is a powder having a diameter of less than 10 μm, and an insulating coating layer is formed, which increases initial battery cell resistance.

SUMMARY OF THE INVENTION

One embodiment of the present invention provides a positive active material for a rechargeable lithium battery that can improve discharge capacity and cycle-life characteristics due to reduced internal resistance.

Another embodiment of the present invention provides a method of preparing the positive active material.

Yet another embodiment of the present invention provides a rechargeable lithium battery including the positive active material.

According to one embodiment of the present invention, provided is a positive active material that includes a composite metal oxide of the following Formula 1, and a compound being capable of intercalating and deintercalating lithium and having the composite metal oxide coated on the surface thereof.

  [Chemical Formula 1]

$$M_{1-x}AlO_2$$

Wherein, in the above Formula 1, M is selected from the group consisting of an alkali metal, an alkaline-earth metal, and combinations thereof, and $0.03 \leq x \leq 0.95$.

Further, M is selected from the group consisting of Li, Na, Mg, K, Ca, Rb, Sr, Cs, and combinations thereof.

The composite metal oxide coated on the compound being capable of intercalating and deintercalating lithium and the remaining composite metal oxide are present in a weight ratio of 1:0.05 to 1:2.5. In one embodiment, the composite metal oxide coated on the compound being capable of intercalating and deintercalating lithium and the remaining composite metal oxide are present in a weight ratio of 1:0.2 to 1:0.6.

The positive active material includes 0.1 to 10 parts by weight of the composite metal oxide based on 100 parts by weight of the compound being capable of intercalating and deintercalating lithium. In one embodiment, the positive active material includes 0.1 to 7 parts by weight of the composite metal oxide based on 100 parts by weight of the compound being capable of intercalating and deintercalating lithium. In another embodiment, the positive active material includes 1.0 to 2.0 parts by weight of the composite metal oxide based on 100 parts by weight of the compound being capable of intercalating and deintercalating lithium.

According to another embodiment, provided is a method of preparing a positive active material for a rechargeable lithium battery that includes reacting an aluminum salt and a metal salt to obtain a nano-sized aluminum metal hydrate, mixing the nano-sized aluminum metal hydrate and a compound being capable of intercalating and deintercalating lithium, and drying the resulting mixture and then heat treating.

According to yet another embodiment, provided is a method of preparing a positive active material for a rechargeable lithium battery that includes reacting an aluminum precursor and a metal salt to prepare a metal aluminum sol, mixing the metal aluminum sol and a compound being capable of intercalating and deintercalating lithium, and drying the mixture and then heat treating.

According to a further embodiment, provided is a rechargeable lithium battery including the positive active material.

DETAILED DESCRIPTION OF THE INVENTION

Figure 1:
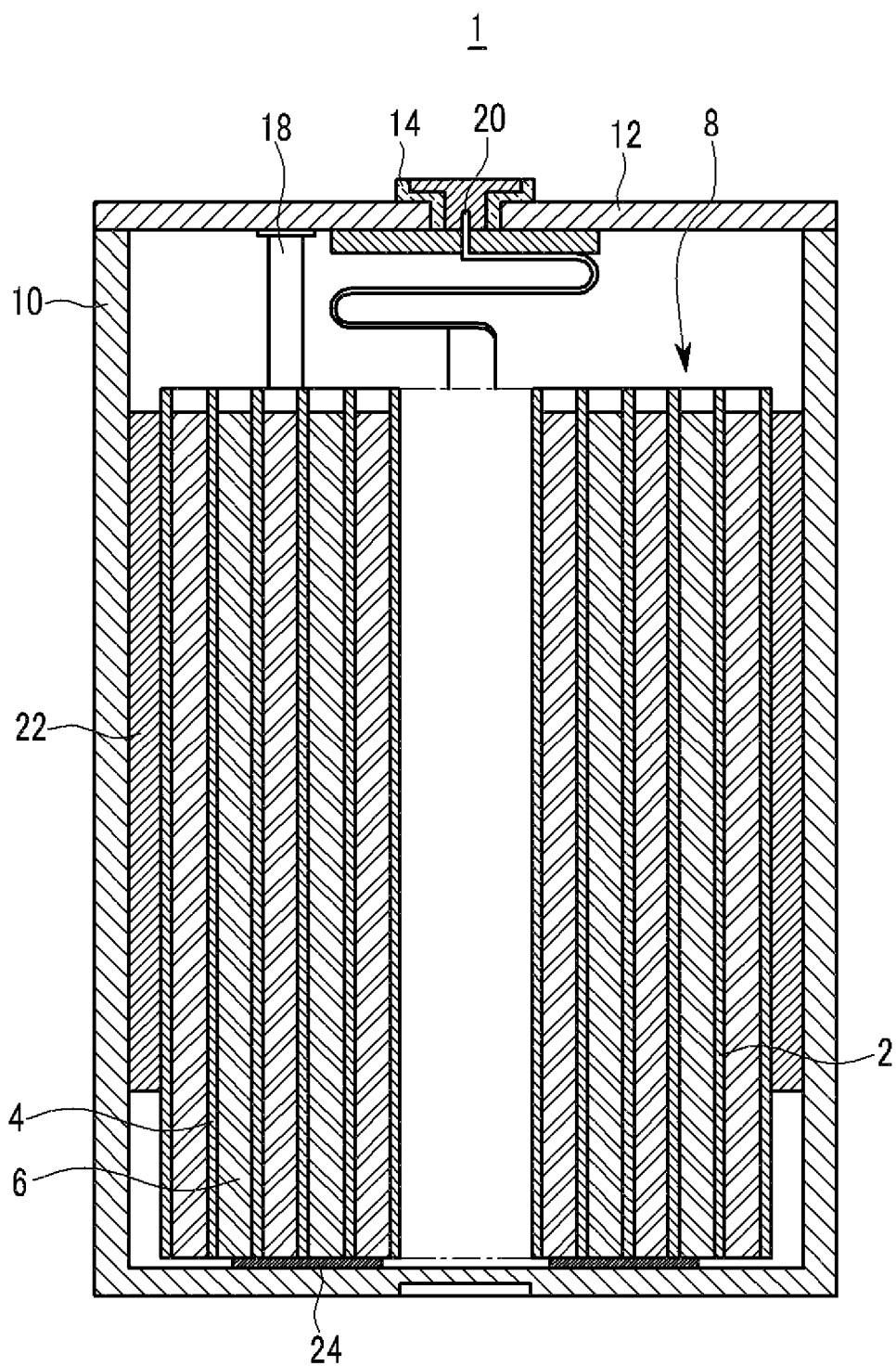
FIG. 1 is a cross-sectional view of a prismatic rechargeable lithium battery according to one embodiment of the present invention.

The present invention relates to a positive active material that can improve discharge capacity and cycle-life characteristics due to reduced internal resistance by including a composite metal oxide. The composite metal oxide increases the impregnation rate of the electrolyte solution to facilitate the transfer of lithium.

The positive active material includes a composite metal oxide represented by the following Chemical Formula 1, and a compound being capable of intercalating and deintercalating lithium and having the composite metal oxide coated on the surface thereof.

$$M_{1-x}AlO_2 \quad \text{[Chemical Formula 1]}$$

Wherein, in the above Formula 1, M is selected from the group consisting of an alkali metal, an alkaline-earth metal, and combinations thereof, and $0.03 \leq x \leq 0.95$.

Further, M is selected from the group consisting of Li, Na, Mg, K, Ca, Rb, Sr, Cs, and combinations thereof.

The compound being capable of intercalating and deintercalating lithium includes, but is not limited thereto, a lithium composite metal oxide or a lithium chalcogenide compound. The lithium composite metal oxide is represented by the following Chemical Formula 2.

$$LiNi_{1-x-y}Co_xM_yO_2 \quad \text{[Chemical Formula 2]}$$

Wherein, in the above Formula 2, M is a metal selected from the group consisting of Mn, Mg, Fe, Al, and combinations thereof, $0 \leq x \leq 1$, $0 \leq y \leq 1$, and $0 \leq x+y \leq 1$.

A part of the composite metal oxide of Chemical Formula 1 is coated on the surface of the compound being capable of intercalating and deintercalating lithium, and the remainder of the composite metal oxide is mixed and remained therewith.

The coated composite metal oxide is present as mixed phases of crystal and amorphous, and it is coated on the surface of the compound being capable of intercalating and deintercalating lithium at a thickness of between 10 to 200 nm. The remaining composite metal oxide also includes both crystal and amorphous phases, in which the amorphous region is larger than the crystal region. Since the composite metal oxide remained in the positive active material consists of nano particles it has a higher surface area. Thereby, it can include the excess electrolyte solution on the surface. It facilitates the lithium mobility and decreases the battery internal resistance so that the impregnation rate of the electrolyte solution is increased.

According to one embodiment of the present invention, the positive active material includes a coated composite metal oxide and a remaining composite metal oxide at a weight ratio of 1:0.05 to 1:2.5. According to another embodiment, the weight ratio ranges from 1:0.2 to 1:0.6. When the weight ratio is less than the above range, the battery internal resistance is increased and the cycle-life characteristics are decreased. On the other hand, if it is more than the above range, similar problems are caused. Furthermore, the composite metal oxide has a particle diameter of 10 to 200 nm. When the particle diameter is the out of the above range, the impregnation rate of the electrolyte solution is deteriorated.

The positive active material includes the composite metal oxide in 0.1 to 10 parts by weight based on 100 parts by weight of the compound being capable of intercalating and deintercalating lithium. According to another embodiment, it ranges from 0.1 to 7 parts by weight. According to further another embodiment, it ranges from 1.0 to 2.0 parts by weight. When the composite metal oxide is included in less than the above range, the effects on adding the composite metal oxide are insufficient, while, if the amount is more than the above range, the battery internal resistance is increased and the cycle-life characteristics are decreased.

According to the positive active material of the present invention, the nano-sized composite metal oxide is coated on the compound being capable of intercalating and deintercalating lithium in a dispersion or sol phase. Such a positive active material may be prepared in accordance with either one of the following two methods.

A method of preparing a positive active material according to one embodiment of the present invention includes:

reacting an aluminum salt with a metal salt to obtain a nano-sized aluminum metal hydrate;

mixing the nano-sized aluminum metal hydrate and a compound being capable of intercalating and deintercalating lithium; and drying the resulting mixture and then heat treating.

Firstly, an aluminum salt and a metal salt are added into a solvent to let them react at 40 to 80° C. for 10 minutes to 2 hours, and the pH is adjusted to be 4 to 6 to provide a nano-sized aluminum metal hydrate.

The aluminum salt may be one selected from the group consisting of aluminum-included hydroxide, oxyhydroxide, nitrate, chloride, carbonate, acetate, oxalate, citrate, and a combination thereof, but it is not limited thereto.

The metal salt may be one selected from the group consisting of hydroxide, oxyhydroxide, nitrate, chloride, carbonate, acetate, oxalate, citrate, and a combination thereof including one selected from the group consisting of an alkali metal, an alkaline-earth metal, and a combination thereof, but it is not limited thereto.

The aluminum salt and the metal salt are adjusted for the stoichiometric ratio to satisfy the molar ratio of Chemical Formula 1.

The solvent may be a single or mixed solvent selected from the group consisting of water and alcohol. According to one embodiment, it includes water. According to one embodiment, the alcohol is a C1 to C4 lower alcohol selected from the group consisting of methanol, ethanol, isopropanol, and a combination thereof.

After completing the reaction, the pH is adjusted to be 4 to 7 by adding one selected from the group consisting of ammonia, sodium hydrate, hydroxide, potassium hydrate, calcium hydrate, and a mixture thereof. Then, an aluminum metal hydrate is precipitated in the reactor bottom.

The precipitated aluminum metal hydrate has a particle diameter of 10 to 200 nm.

The obtained nano-sized aluminum metal hydrate is dispersed in a solvent, added with a compound being capable of intercalating and deintercalating lithium, and agitated at 40 to 80° C. for 10 to 48 hours.

The solvent includes a C1 to C4 lower alcohol selected from the group consisting of methanol, ethanol, isopropanol, and a combination thereof.

The provided compound is dried and heat-treated to provide a positive active material according to the present invention.

The drying process is carried out at 50 to 90° C. for 30 minutes to 3 hours to suppress the solvent or impurities remained therein. Further, the heat treatment is performed at 500 to 800° C. for 1 hour to 5 hours. According to another embodiment, it is performed under the atmosphere of oxygen, air, or a mixture thereof.

According to another embodiment, a method of preparing a positive active material includes:

reacting an aluminum precursor with a metal salt to provide a metal aluminum sol;

mixing the metal aluminum sol with a compound being capable of intercalating and deintercalating lithium; and drying the provided active material precursor and heat treating.

First, an aluminum precursor and a metal salt are added into a solvent and reacted at 40 to 80° C. for 10 minutes to 2 hours to provide a nano-sized metal aluminum sol.

The aluminum precursor may be an aluminum alkoxide, and representative examples thereof include one selected from the group consisting of aluminum ethoxide, aluminum propoxide, aluminum isopropoxide, aluminum butoxide, and a mixture thereof.

The metal salt includes hydroxide, oxyhydroxide, nitrate, chloride, carbonate, acetate, oxalate, citrate, and a combination thereof including one selected from the group consisting of an alkali metal, an alkaline-earth metal, and a combination thereof, but is not limited thereto.

The aluminum precursor and the metal salt may be adjusted for the stoichiometric ratio to satisfy the molar ratio referenced in Chemical Formula 1.

The solvent may include a single or mixed solvent of water and alcohol. According to another embodiment, it includes water. The alcohol may include a C1 to C4 lower alcohol selected from the group consisting of methanol, ethanol, isopropanol, and a combination thereof.

From the reaction, a nano-sized metal aluminum sol is provided. The sol has a particle diameter of 10 to 200 nm.

To the nano-sized metal aluminum sol, a compound being capable of intercalating and deintercalating lithium is added and agitated at 40 to 80° C. for 10 to 48 hours to provide an active material precursor.

The solvent includes a C1 to C4 lower alcohol selected from the group consisting of methanol, ethanol, isopropanol, and a combination thereof.

The obtained active material precursor is dried and heat-treated to provide a positive active material according to the present invention.

The drying process is performed at 50 to 90° C. for 30 minutes to 3 hours, and it suppresses a solvent or impurities therein. According to one embodiment, the heat treatment is performed at 500 to 800° C. for 1 hour to 5 hours. According to another embodiment, it is performed under the atmosphere of oxygen, air, or a mixture thereof.

The obtained material is used for a positive active material for a rechargeable lithium battery.

A rechargeable lithium battery includes a positive electrode including a positive active material, a negative electrode including a negative active material, and an electrolyte therebetween, wherein the positive active material includes the lithium composite metal oxide according to the present invention.

FIG. 1 is a cross-sectional view of a prismatic rechargeable lithium battery according to the embodiment of the present invention. Referring to FIG. 1, a separator 6 is inserted between a positive electrode 2 and a negative electrode 4. They are spiral-wound to form an electrode assembly 8. The electrode assembly 8 is inserted into a case 10. The battery is sealed on top with a cap plate 12 and a gasket 14. The positive electrode 2 and the negative electrode 4 are respectively mounted with a positive tab 18 and a negative tab 20. Insulators 22 and 24 are inserted to prevent an internal short-circuit. Then, an electrolyte is injected before the battery is sealed. The electrolyte impregnates the separator 6. In the drawing, a prismatic rechargeable battery is illustrated but the present invention is not limited thereto and can include any shape as long as it can work as a battery.

A method of preparing a positive electrode includes mixing the positive active material according to the present invention, a conductive material, a binder, and a solvent to provide a positive active material composition, coating the same directly on an aluminum current collector, and drying the same. The positive active material composition is cast on a separate supporter, and peeled off from the supporter to provide a film. Then, the film is laminated on the aluminum current collector.

The conductive material may include carbon black, graphite, or a metal powder. The binder may include vinylidene fluoride/hexafluoro propylene copolymer, polyvinylidene fluoride, polyacrylonitrile, polymethyl methacrylate, polytetrafluoro ethylene, and a mixture thereof. The solvent may include N-methylpyrrolidone, acetone, tetrahydrofuran, decane, and so on. The adding amounts of the positive active material, the conductive material, the binder, and the solvent are used as in the conventional rechargeable lithium battery.

As the positive electrode, a negative electrode is obtained by mixing a negative active material, a binder, and a solvent to provide a cathode active material composition. The cathode active material composition is coated directly on a copper current collector, or is cast on a separate support, and peeled off from the support as a negative active material film which is then laminated on the copper current collector. The negative active material composition may further include, if required, a conductive material.

The negative active material may include a material being capable of intercalating/deintercalating lithium ions. For example, it includes a lithium metal or lithium alloy, coke, artificial graphite, natural graphite, a sintered organic polymer compound, carbon fiber, and so on. Furthermore, the conductive material, the binder, and the solvent are the same as in the positive electrode.

The separator can be a generally-used separator in a rechargeable lithium battery. For example, the separator may be selected from polyethylene, polypropylene, or polyvinylidene fluoride mono-layered, or multi-layered separators such as a polyethylene/polypropylene double-layered separator, a polyethylene/polypropylene/polyethylene triple-layered separator, or a polypropylene/polyethylene/polypropylene triple-layered separator.

The electrolyte filled in the rechargeable lithium battery can be a non-aqueous electrolyte or a solid electrolyte that includes a lithium salt dissolved therein.

The solvent of the non-aqueous electrolyte includes, but is not limited to, a cyclic carbonate such as ethylenecarbonate, propylenecarbonate, butylenecarbonate, vinylenecarbonate, and so on; a linear carbonate such as dimethylcarbonate, methylethylcarbonate, diethylcarbonate, and so on; an ester such as methyl acetate, ethyl acetate, propyl acetate, methyl propionate, ethyl propionate, γ-butyrolactone, and so on; an ether such as 1,2-dimethoxyethane, 1,2-diethoxyethane, tetrahydrofuran, 1,2-dioxane, 2-methyltetrahydrofuran, and so on; a nitrile such as acetonitrile; and an amide such as dimethylformamide. These solvents can be used singularly or in combinations. In particular, according to one embodiment, a mixed solvent of the cyclic carbonate and the linear carbonate may be appropriate.

For the electrolyte, a polymer gel electrolyte where electrolyte solutions are impregnated in a polymer such as polyethyleneoxide, or polyacrylonitrile, or an inorganic solid such as LiI, $Li_3N$, and so on may be used.

The lithium salt is selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, LiCl, and LiI.

The following examples illustrate the present invention in more detail. These examples, however, should not in any sense be interpreted as limiting the scope of the present invention.

EXAMPLES

Positive Active Material

Example 1

1 g of aluminum nitrate and 0.5 g of lithium nitrate were added into a reactor and mixed with 50 ml of water at 70° C. for 30 minutes. To the reactor, 0.4 g of ammonia was slowly added to adjust the pH to be 5, and then aluminum lithium hydrate was precipitated at the reactor bottom. The precipitated aluminum lithium hydrate was obtained and dried under reduced pressure at 50° C. for 3 hours to obtain a white nano-sized powder (0.5 g, 10 to 200 nm).

The aluminum lithium hydrate was dispersed in 100 ml of ethanol, 100 g of $LiCoO_2$ (10 μm) was added, and the mixture was agitated at 50° C. for 20 hours. Subsequently, the obtained precursor was dried at 100° C. for 3 hours and heat-treated at 700° C. for 5 hours to provide a positive active material.

Example 2

A positive active material was obtained in accordance with the same procedure as in Example 1 except that 2.0 g of aluminum nitrate and 1.0 g of lithium nitrate were used to provide aluminum lithium hydrate (0.8 g).

Example 3

A positive active material was obtained in accordance with the same procedure as in Example 1 except that 2.5 g of aluminum nitrate and 1.5 g of lithium nitrate were used to provide aluminum lithium hydrate (1.1 g).

Example 4

A positive active material was obtained in accordance with the same procedure as in Example 1 except that 3.0 g of aluminum nitrate and 2.0 g of lithium nitrate were used to provide aluminum lithium hydrate (1.4 g).

Example 5

A positive active material was obtained in accordance with the same procedure as in Example 1 except that 3.5 g of aluminum nitrate and 2.5 g of lithium nitrate were used to provide aluminum lithium hydrate (1.7 g).

Example 6

2.0 g of aluminum isoproxide and 0.5 g of lithium acetate were added into a reactor and mixed with 50 ml of ethanol at 60° C. for 10 hours, and then cooled to 25° C. Hereto, 100 g of $LiCoO_2$ was added and agitated at 50° C. for 12 hours. The obtained active material precursor was dried at 100° C. and heat-treated at 700° C. for 5 hours to provide a positive active material.

Example 7

A positive active material was obtained in accordance with the same procedure as in Example 6 except that 2.0 g of aluminum isoproxide and 0.8 g of lithium acetate were used.

Example 8

A positive active material was obtained in accordance with the same procedure as in Example 6 except that 2.0 g of aluminum isoproxide and 0.5 g of lithium acetate were used.

Example 9

A positive active material was obtained in accordance with the same procedure as in Example 6 except that 2.0 g of aluminum isoproxide and 0.1 g of lithium acetate were used.

Comparative Example 1

A positive active material was prepared as described in Japanese Patent Laid-open Publication No. 09-055210.

2.0 g of aluminum isoproxide and 100 g of $LiCoO_2$ were added into a reactor and mixed with 50 ml of ethanol at 60° C. for 10 hours to let them react. The resultant was dried at 100° C. for 3 hours and heat-treated at 700° C. for 5 hours to provide a positive active material where $Al_2O_3$ was coated on $LiCoO_2$.

Comparative Example 2

A positive active material was prepared in accordance with the procedure as described in U.S. Pat. No. 5,705,291.

2.0 g of aluminum nitrate and 100 g of $LiCoO_2$ were added into a reactor filled with 40 ml of water and mixed at 60° C. for 10 hours to let them react. The resultant was dried at 100° C. for 3 hours and heat-treated at 700° C. for 5 hours to provide a positive active material where $Al_2O_3$ was coated on $LiCoO_2$.

Experimental Example 1

Positive active materials obtained from Examples 1 to 9 were measured for the compositions of composite metal oxide therein in accordance with ICP analysis, and the results are shown in the following Table 1.

TABLE 1

|  | $M_{1-x}AlO_2$ | x value |
|---|---|---|
| Example 1 | $Li_{0.97}AlO_2$ | 0.03 |
| Example 2 | $Li_{0.9}AlO_2$ | 0.1 |
| Example 3 | $Li_{0.5}AlO_2$ | 0.5 |
| Example 4 | $Li_{0.2}AlO_2$ | 0.8 |
| Example 5 | $Li_{0.02}AlO_2$ | 0.98 |
| Example 6 | $Li_{0.95}AlO_2$ | 0.05 |
| Example 7 | $Li_{0.8}AlO_2$ | 0.2 |
| Example 8 | $Li_{0.2}AlO_2$ | 0.8 |
| Example 9 | $Li_{0.05}AlO_2$ | 0.95 |

Experimental Example 2

The powdery positive active materials obtained from Examples 1 to 9 were pulverized by a sieve having a diameter 20 μm. $LiCoO_2$ having a particle diameter of 10 μm was completely thrown out, and the composite metal oxide powders that were not coated on the $LiCoO_2$ surface were remained on the sieve as aggregate. The remained amounts were calculated and are shown in the following Table 2.

TABLE 2

|  | Amount of composite metal oxide (g) | Amount of coating composite metal oxide (g) | Amount of remaining composite metal oxide (g) | Weight ratio of coating composite metal oxide and remaining composite metal oxide |
|---|---|---|---|---|
| Example 1 | 0.5 | 0.45 | 0.05 | 1:0.11 |
| Example 2 | 0.8 | 0.67 | 0.13 | 1:0.19 |
| Example 3 | 1.1 | 0.89 | 0.21 | 1:0.24 |
| Example 4 | 1.4 | 0.9 | 0.5 | 1:0.55 |
| Example 5 | 1.7 | 0.8 | 0.9 | 1:1.13 |
| Example 6 | 0.12 | 0.08 | 0.04 | 1:0.5 |
| Example 7 | 0.32 | 0.22 | 0.1 | 1:0.45 |
| Example 8 | 1.31 | 1.17 | 0.14 | 1:0.12 |
| Example 9 | 5.25 | 5.0 | 0.25 | 1:0.05 |

Experimental Example 3

Figure 2:
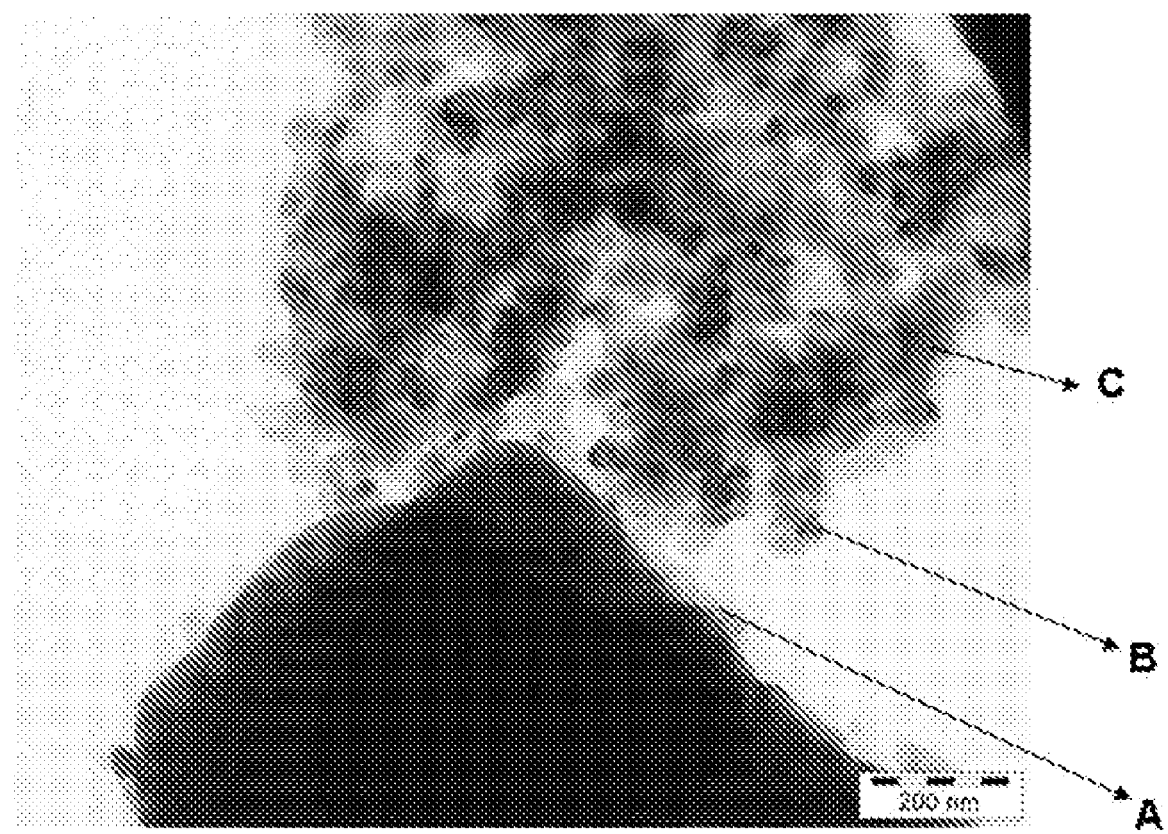
FIG. 2 is a transmission electron microscope (TEM) photograph of the positive active material according to Example 3.
Figure 3:
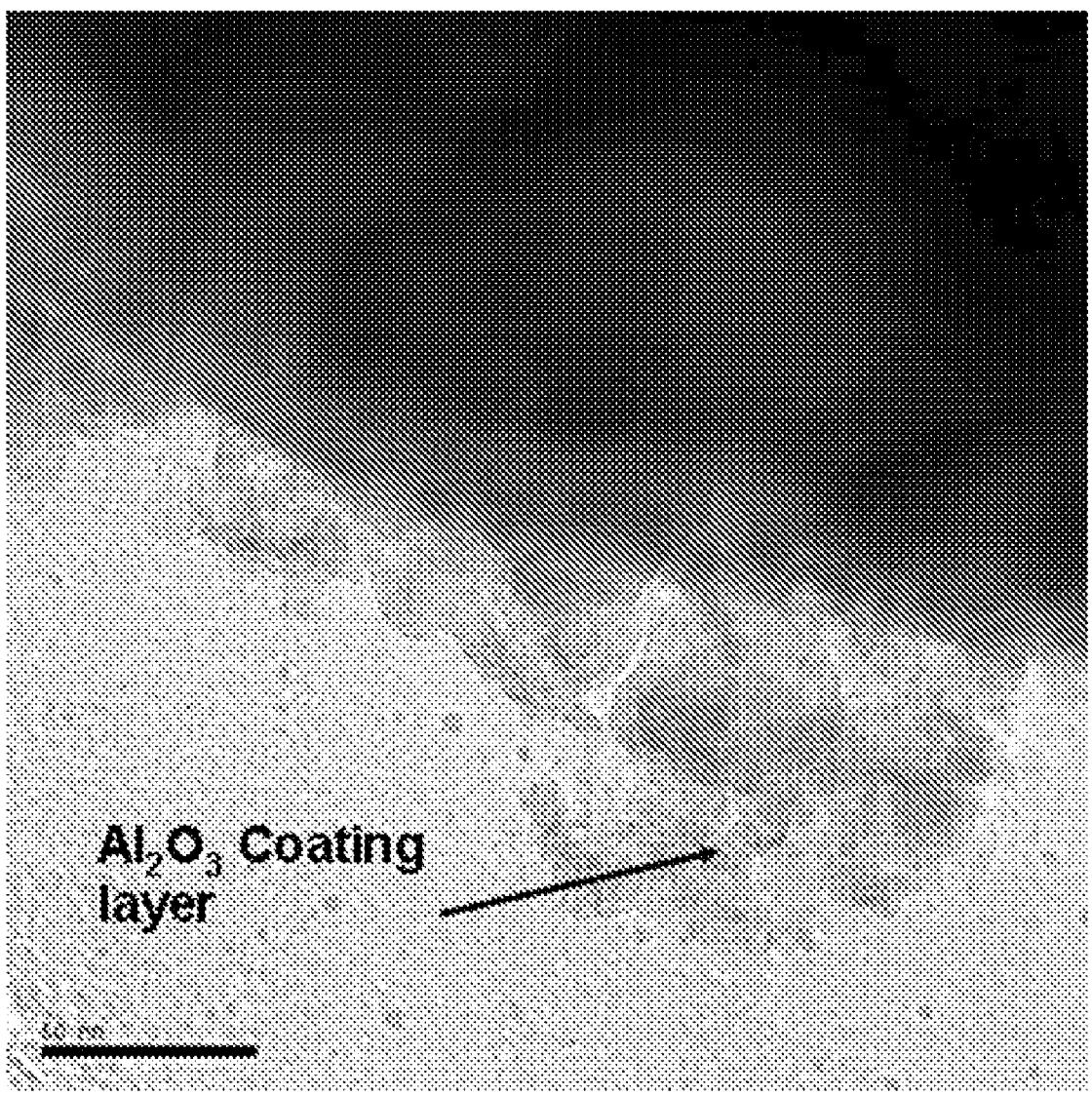
FIG. 3 is a transmission electron microscope (TEM) photograph of the positive active material according to Comparative Example 1.

The positive active materials obtained from Example 3 and Comparative Example 1 were measured by a scan electron microscope and the results are shown in FIG. 2 and FIG. 3.

FIG. 2 is a transmission electron microscope (TEM) photograph of the positive active material according to Example 3, and FIG. 3 is a transmission electron microscope (TEM) photograph of the positive active material according to Comparative Example 1.

Referring to FIG. 2, in the positive active material according to Example 3, some $Li_{0.5}AlO_2$ (A part) were coated on the $LiCoO_2$ surface and the other $Li_{0.5}AlO_2$ (B and C parts) were aggregated with each other and remained apart from $LiCoO_2$. $Li_{0.5}AlO_2$ had a particle diameter of 50 nm or less, and the $Li_{0.5}AlO_2$ coated on $LiCoO_2$ had a thickness of 200 nm or less. The remaining $Li_{0.5}AlO_2$ had both a completely crystallized region (B part) and a non-crystallized region (C part).

To the contrary, the positive active material according to Comparative Example 1 as shown in FIG. 3 was coated with $Al_2O_3$ in 100 nm or more, and the coating layer was uneven.

Half-cell

Lithium composite metal oxides according to Examples 1 to 4 and Comparative Example 1 were used as positive active materials to provide coin-type cells.

The lithium composite metal oxide, Super P (conductive material), and polyvinylidene fluoride (binder) were mixed at a weight ratio of 96/2/2 to provide a composition for a positive electrode. The composition for a positive electrode was coated on an Al-foil in a thickness of 300 μm and dried at 130° C. for 20 minutes. Then, it was pressed under a pressure of 1 ton to provide a positive electrode.

The provided positive electrode and a counter electrode of a lithium metal were used to provide a coin-type cell. The electrolyte includes 1M $LiPF_6$ dissolved in a mixed solvent of an ethylene carbonate (EC) and dimethyl carbonate (DMC) at a volume ratio of 1:1.

Experimental Example 4

The provided coin cells were measured by a charge and discharge test (@40) at a voltage from 3.0 to 4.3 V at room temperature (30° C.) by using a charge and discharge device, and the results are shown in the following Table 3.

TABLE 3

|  | Discharge capacity at 0.1 C (mAh/g) | Discharge capacity at 1 C (mAh/g) | Internal resistance (ohm) | Discharge capacity after 40 cycles at 1 C |
|---|---|---|---|---|
| Example 1 | 183 | 160 | 300 | 70 |
| Example 2 | 183 | 162 | 270 | 95 |
| Example 3 | 183 | 170 | 180 | 145 |
| Example 4 | 180 | 163 | 260 | 100 |
| Example 5 | 175 | 155 | 290 | 75 |
| Example 6 | 183 | 160 | 310 | 73 |
| Example 7 | 184 | 163 | 280 | 95 |
| Example 8 | 183 | 167 | 250 | 110 |
| Example 9 | 183 | 170 | 170 | 143 |
| Comparative Example 1 | 180 | 153 | 310 | 75 |
| Comparative Example 2 | 180 | 150 | 340 | 60 |

As shown in Table 3, the cells including positive active materials obtained from Examples 1 to 9 have lower internal resistance and superior discharge capacity to those of Comparative Examples 1 and 2.

When the positive active material was prepared in accordance with the process in Examples 3 and 6, it is estimated that the cycle-life characteristics are improved since the discharge capacity is increased. When it includes the active material according to the Examples, $Li_{1-x}AlO_2$ phase increases the impregnation rate of the electrolyte solution to facilitate lithium mobility, and thereby it decreases the battery internal resistance.

The composite metal oxide of the positive active material increases impregnation of an electrolyte, improves lithium mobility, and decreases internal resistance of a rechargeable lithium battery, and thereby improves discharge capacity and cycle-life characteristics.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A positive active material for a rechargeable lithium battery comprising:
    a composite metal oxide of the following Formula 1; and
    a compound being capable of intercalating and deintercalating lithium having the composite metal oxide coated on the surface thereof, $$M_{1-x}AlO_2 \quad \text{[Chemical Formula 1]}$$

wherein, in the above Formula 1, M is selected from the group consisting of an alkali metal, an alkaline-earth metal, and combinations thereof, and $0.03 \leq x \leq 0.95$,
    wherein the compound being capable of intercalating and deintercalating lithium is a lithium compound metal oxide.

2. The positive active material of claim 1, wherein M is selected from the group consisting of Li, Na, Mg, K, Ca, Rb, Sr, Cs, and combinations thereof.

3. The positive active material of claim 1, wherein x ranges from 0.5 to 0.8.

4. The positive active material of claim 1, wherein the positive active material comprises 0.1 to 10 parts by weight of the composite metal oxide based on 100 parts by weight of the compound being capable of intercalating and deintercalating lithium.

5. The positive active material of claim 1, wherein the composite metal oxide coated on the compound being capable of intercalating and deintercalating lithium and the remaining composite metal oxide are present in a weight ratio of 1:0.05 to 1:2.5.

6. The positive active material of claim 1, wherein the composite metal oxide has a particle size of 10 to 200 nm.

7. The positive active material of claim 1, wherein the lithium composite metal oxide is represented by the following Formula 2:

$$Li\,Ni_{1-x-y}Co_xM_yO_2 \quad \text{[Chemical Formula 2]}$$

wherein, in the above Formula 2, M is a metal selected from the group consisting of Co, Mn, Mg, Fe, Ni, Al, and combinations thereof, $0 \leq x \leq 1$, $0 \leq y \leq 1$, and $0 \leq x+y \leq 1$.

8. A rechargeable lithium battery comprising:
    a positive electrode comprising a positive active material;
    a negative electrode comprising a negative active material; and
    an electrolyte,
    wherein the positive active material comprises
    a composite metal oxide of the following Formula 1, and
    a compound being capable of intercalating and deintercalating lithium having the composite metal oxide coated on the surface thereof, $$M_{1-x}AlO_2 \quad \text{[Chemical Formula 1]}$$

wherein, in the above Formula 1, M is selected from the group consisting of an alkali metal, an alkaline-earth metal, and combinations thereof, and $0.03 \leq x \leq 0.95$,
    wherein the compound being capable of intercalating and deintercalating lithium is a lithium compound metal oxide.

* * * * *